United States Patent [19]

Driscoll

[11] 4,006,306
[45] Feb. 1, 1977

[54] AUDIO SIGNAL PROCESSING APPARATUS

[75] Inventor: Norman Joseph Driscoll, Westwood, N.J.

[73] Assignee: Yudin Industries, Inc., Murray Hill, N.J.

[22] Filed: Oct. 10, 1975

[21] Appl. No.: 621,534

[52] U.S. Cl. .................. 179/1 GQ; 179/1 SW; 179/100.4 ST
[51] Int. Cl.² ......................................... H04R 5/00
[58] Field of Search ............ 179/1 GQ, 1 G, 15 BT, 179/1 SW, 100.1 TD, 100.4 ST; 325/36

[56] References Cited
UNITED STATES PATENTS

| | | | |
|---|---|---|---|
| 3,493,681 | 2/1970 | Richards | 179/1 SW |
| 3,686,471 | 8/1972 | Takahashi | 179/15 BT |
| 3,708,631 | 1/1973 | Bauer et al. | 179/1 GQ |
| 3,806,820 | 4/1974 | Uchiyama | 179/1 SW |
| 3,818,136 | 6/1974 | Schott | 179/1 GQ |

Primary Examiner—Douglas W. Olms
Attorney, Agent, or Firm—Hopgood, Calimafde, Kalil, Blaustein & Lieberman

[57] ABSTRACT

Improved audio reproduction apparatus permits upgrading a two channel high fidelity ("stereo") system to four channel ("quadraphonic") capability, while flexibly accommodating varying four channel source signal formats, e.g., four channel discrete, or encoded two channel SQ (e.g., tape, FM) or CD-4 (phonograph). The composite arrangement includes demodulation circuitry for the variously formated incoming signals, and plural variable gain amplifier arrays for final signal source selection which is readily effected by off-board minimal, DC switching.

11 Claims, 1 Drawing Figure

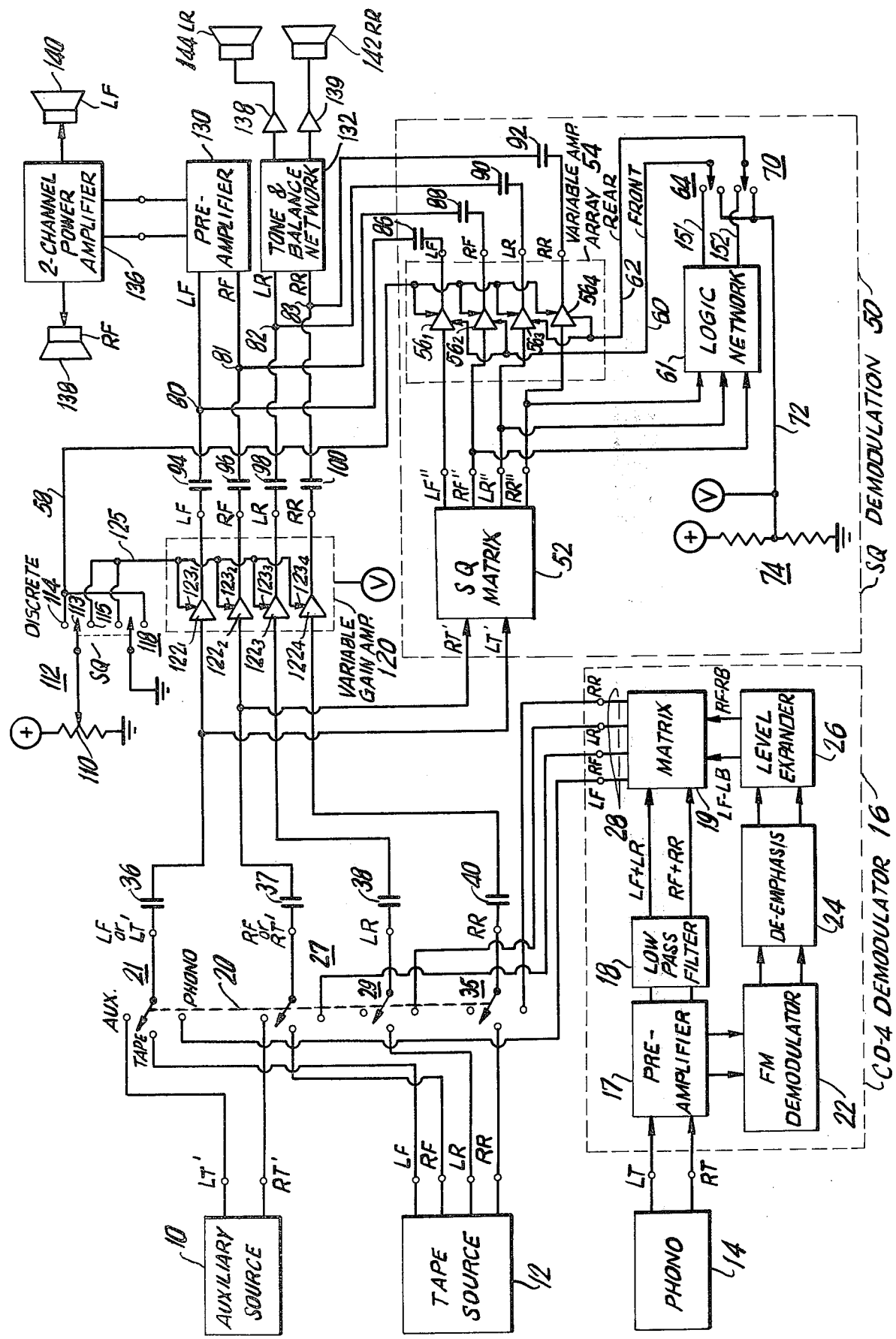

AUDIO SIGNAL PROCESSING APPARATUS

This invention relates to audio reproduction apparatus and, more specifically, to audio high fidelity playback apparatus permitting upgrading of a two channel audio system to a four channel system with full four channel discrete, and CD-4 and SQ encoded two channel demodulating capability.

It is an object of the present invention to provide improved electronic audio reproduction equipment.

More specifically, objects of the present invention are the provision of audio apparatus for converting a two channel "stereo" audio high fidelity system to four channels; for properly and flexibly processing variously encoded and formatted four channel signal sources; and for effecting the foregoing without requiring extensive mechanical signal switching, with its attendant expense and noise ingress difficulties.

The above and other objects of the present invention are realized in specific illustrative four channel audio signal processing apparatus for developing four quadrature signals from input sources of various format, including four channel discrete (e.g., four separate tape tracks) and two channel encoded, e.g., SQ-encoded two track tape or FM broadcast, and CD-4 encoded phonographic playback.

The arrangement converts a CD-4 program to four discrete signals, source selection being made to provide a desired discrete signal ensemble to a first array of variable gain amplifiers. An SQ-encoded two channel program is operated upon by matrixing and logic circuitry, and by a second array of variable gain amplifiers. A DC level selection between the variable gain amplifier arrays is then implemented to effect final program selection with minimal off-board wiring.

The above and other objects and features of the present invention will become more clear from the following discussion regarding a specific illustrative audio reproduction, signal processing arrangement, described fully hereinbelow in conjunction with the accompanying schematic drawing thereof.

Referring now to the drawing, there is shown specific illustrative quadraphonic audio reproduction apparatus for receiving signals from plural diverse input signal sources, and for developing four quadraphonic output signals representing right front (herein, RF), left front (LF), right rear (RR), and left rear (LR) versions of an audio program. The respective audio program versions, or portions, are then converted from the electronic domain to audible programs via four loud speakers 138, 140, 142 and 144. The loud speakers are typically located and spaced about the four corners of a room or similar enclosure to provide a full measure of listening presence or realism.

The input signal sources with which the instant audio signal processing apparatus is operative may comprise, for example, a tape deck 12 which directly supplies the requisite four discrete program variations LF, RF, LR and RR to respectively eminate from the loud speakers 140, 138, 144 and 142. The input sources may further include a phonograph 14 which supplies two output, left total (LT) and right total (RT) signals having the four program channels encoded thereon. The encoding format may comprise, for example, the so-called CD-4 system which includes base band sum signals (LF + LR and RF + RR), and difference signals (LF − LR and RF − RR) which frequency modulates a subcarrier. Also, the ensemble of input signal sources may comprise an auxiliary source 10, such as a two channel tape deck or FM broadcast receiving tuner which provides left total (LT') and right total (RT') signals encoded in accordance with the SQ system more fully considered below. Moreover, the auxiliary source (or sources) 10 may comprise a source of conventional stereo material which inherently includes four channel (phase) information (or a conventional or SQ-encoder output in phonograph 14).

The signal processing apparatus of the instant invention is adapted to convert and upgrade conventional two channel, so called stereo high-fidelity equipment of common experience into the newer four channel quadraphonic system. Accordingly, as a starting point, the stereo owner already has in his possession one or more two channel signal sources, e.g., a stereo FM receiver, a tape deck or the like, a two channel power amplifier 136 (possibly preceded by a two channel preamplifier), and the two loud speakers 138 and 140 driven by the amplifier 136. It is the purpose of the electronic apparatus of the instant invention to permit the stereo owner to continue to gainfully employ the amplifier and speakers 136, 138 and 140 in the quadraphonic system created; to permit the stereo owner to use those input signal sources which remain compatible with four channel programming; and to provide only that additional apparatus required to demodulate the varying four channel programming to provide source and modulation, and to audibly reproduce the two additional program versions.

To this end, the signals supplied by the sources 10, 12 and 14 are supplied to various decks of a ganged input selector switch 20 which includes four three-position switch banks 21, 27, 29 and 35. The four switch banks 21, 27, 29 and 35 have moveable transfer (output) members which are respectively associated with the LF or LT, RF or RT, LR or RR program versions. The upper position for the ganged switches 20 selects the auxiliary audio source 10; the second position selects the four channel discrete (tape) source 12 and the lower position selects the phonograph 14.

Considering first the composite audio apparatus of the drawing in overview, the CD-4 encoded LT and RT phonograph (if present) outputs are converted to the requisite four channel discrete signals LF, RF, RR and LR and the ganged switches 20 employed in one of their two lower selected positions to select one of the two four channel discrete program signal ensembler supplied by the tape source 12 or the CD-4 modulator 16 (if desired) to the input of a first array 120 of voltage controlled, variable gain amplifiers $122_1$ through $122_4$. The left and right signals at the output of the switch banks 21 and 27 may also comprise the left total (LT') and right total (RT') SQ encoded signals. Accordingly, the output of the switch 20 decks 21 and 27 is also supplied to an SQ demodulator 50 for conversion to the requisite four discrete LF, RF, LR and RR signals. The demodulator 50 includes an SQ de-matrixing network 52, a front vis-a-vis rear separation enhancing logic network 61, and a second array 54 of voltage controlled variable gain amplifiers $56_1$–$56_4$.

A selection is made between the four discrete signals supplied as inputs to the variable gain amplifier array 54 (SQ encoded output of source 10) and those supplied to the amplifier array 120 (discrete or CD-4 encoded supplied by sources 12 and 14 and selected by switch 20). In particular, the array 54–120 selection is made by a double pole double throw switch 118 which supplies an amplifier blocking low control voltage (e.g., ground) to the four amplifiers of one array, while providing an amplifier enabling relatively high control signal developed at the tap of a volume control potentiometer 110 to the voltage control ports of the other amplifier array.

The requisite four program signals present at the outputs of the selected amplifier array 120 or 54 are then capacitively coupled by an associate capacitor group 94, 96, 98 and 100, or 86, 88, 90 and 92 to an output summing point 80, 81, 82 or 83. The left front and right front signals at the summing points 80 and 81 pass through a two channel preamplifier 130 for gain equalization with the rear signals, and are amplified and audibly radiated by the two channel power amplifier 136 and the right front and left front loud speakers 138 and 140. The left rear and right rear programs present at the summing nodes 82 and 83 pass through a conventional variable tone control and channel balancing network (for rear channel control) 132; are amplified in power amplifiers 138 and 139, and are audibly radiated by right rear and left rear loud speakers 142 and 144.

With the above general overview in mind, attention will now be directed in greater detail to several of the circuit elements described above from a functional standpoint. The CD-4 demodulator 16 includes a preamplifier 17 and following low-pass filter 18 (all two channel) for eliminating the modulated subcarriers and supplying the base band sum signals LF + LR and RF + RR as first inputs to a dematrixing network 19. The preamplifier 17 supplies the subcarriers to FM demodulator 22 for recovering the raw frequency modulated difference signals LF − LR and RF − RR. The difference signals pass through a de-emphasis network 24 and (if desired) a level expander 26 and pass as second inputs to the matrix 19. The matrix 19 effects linear sum and differencing of the inputs thereto to derive the requisite four discrete signals, LF, RF, LR and RR. The CD-4 modulator 16 may be discretely formed, or may comprise any of the available integrated circuit versions thereof, e.g., the QSI-5022 CD-4 demodulator available from the Matsushita Corporation.

The SQ demodulator 50 includes the SQ dematrix 52 for recovering four outputs signals, LF'', RF'', LR'' and RR'' which may per se form the needed four program variation signals. That is, the SQ matrix 52 receives the input two channel SQ-encoded total programs, RT' and LT' and generates the LF'', RF'', LR'' and RR'' signals by effecting the appropriate algebraic summations. One illustrative set of matrixing equations is as follows:

$$LF'' = 0.912 \, RT' + 0.088 \, LT'$$

$$RF'' = 0.912 \, LT' + 0.088 \, RT'$$

$$RB'' = \sqrt{2} \, [0.714 \, (jRT' - LT') + 0.286 \, (RF'jLT')]$$

$$LB'' = \sqrt{2}[0.714 \, (jLT' - RT') + 0.286 \, (LT' - jRT')]$$

The four program signal outputs of the dematrix network 52 are supplied to the variable gain amplifier array 54, i.e., to a different variable gain amplifier $56_i$. A source selection between left front, right front, left rear and right rear signals supplied as inputs to the variable gain amplifiers 120 or 54 is then made by appropriately positioning the switch 118 which turns on those amplifiers connected to the tap of the volume control potentiometer 110 and turns off the amplifiers having grounded control ports. Moreover, if the switch 118 alternates between sources, a constant output audio amplification results since the selected enabled amplifier array 120 or 54 is activated by a like potentiometer-supplied voltage level.

It has been found desirable to sometimes enhance separation between the front and rear signals at the output of the SQ variable gain amplifiers 56. To this end, logic network 61 is connected to at least one front and one rear channel output of the matrix 52, and provides output leads 151 and 152 further control signals for further varying the relative gains of the amplifiers 56 via poles 65 and 70 of a double pole, double throw switch 64. In particular, (and assuming that switches 64 and 70 have their transfer members in the upper position shown in the drawing to render useful output of the logic network 61), the logic network 61 determines whether the rear or front program signals predominate (e.g., on the basis of size, uniqueness or the like). The circuit 61 then increases the gain if the forward channel amplifiers $56_1$ and $56_2$ vis.-a-vis. the rear channel amplifiers $56_3$ and $56_4$ by unbalancing the gain controlling potentials on lines 151-60, 152-62 if the front channel signals predominate, and vice-versa. Employment of the logic circuit 61 enhances the front to back audio separation several fold.

The switch poles 65 and 70 are provided to connect the second (lower) gain control ports of the amplifiers 56 to a constant voltage provided by a voltage divider 74 rather than to the outputs of the logic network 61 when the enhanced front to back separation is not desired, e.g., in the presence of hiss which becomes extremely unpalatable if amplitude modulated to creating a breatihing in like overtone.

The SQ dematrix 52, the logic network 61 and the variable gain amplifiers array 56 (and the array 120) may again be formed with discrete components or, alternately, may be of integrated circuit form and respectfully comprise, for example, units vended by the Motorola, Inc., under the designations MC1312, MC1315 and MC1314.

The arrangement depicted in the drawing has thus been shown by the above to provide all of the requisite functions required for reproducing four channel sound programs supplied by either a four channel discrete source or by variously encoded two channel sources, and to develop the needed four program characterizing signals in a reliable, flexible manner minimizing off-board signal cabling for mode and source switching.

It will be appreciated that the above-described arrangement is merely illustrative of the principles of the present invention. Numerous modifications and adaptations thereof will be readily apparent to those skilled in the art without departing from the spirit and scope of the present invention.

What is claimed is:

1. In combination, four conducting means, source and selector means for selectively supplying four channel discrete quadraphonic audio program signals to said four conducting means and for supplying four channel encoded signal information to a subset of said four conducting means, a first array of switched amplifiers each having input terminals connected to a different one of said four conducting means, demodulator means including decoding means for producing four channel signals from two input signals having inputs connected to said subset of said four conducting means, a second array of switched amplifiers each receiving a different one of said four demodulated four channel signals from said demodulator means, plural linear junction means each connected to the outputs of a different pair of switched amplifiers in said first and second amplifier arrays, and discrete-demodulated four channel program selection means including means for enabling one of said amplifier arrays and means for disabling the other of said amplifier arrays.

2. A combination as in claim 1, wherein said four discrete quadraphonic audio program signal supplying source means comprises four channel encoded demodulating means including low pass filter sum signal passing means, FM subcarrier difference signal demodulating means, and matrix means for matrixing the outputs of said low pass filter means and said FM subcarrier demodulating means.

3. A combination as in claim 2 wherein said four discrete quadraphonic program signal supplying source means further comprises an input port for receiving such signals, and selector switch means having outputs switchably connectable to said four discrete signal receiving input port and to the outputs of said matrix means of said four channel encoded signal demodulating means.

4. A combination as in claim 1 wherein said first and second switched amplifier arrays each include a plurality of amplifiers each having a voltage control port, and wherein said discrete encoded amplifier array selection means comprises means for supplying an amplifier enabling potential to said voltage control port of all the amplifiers of one of said amplifier arrays and for supplying an amplifier disabling signal to said voltage control port of all of the amplifiers of the other of said amplifier arrays.

5. A combination as in claim 4 wherein said amplifier array enabling means includes means for supplying a variable amplifier enabling volume control signal.

6. A combination as in claim 1 wherein said demodulator means includes dematrixing means having plural outputs each connected to the input of a different amplifier of said second amplifier array.

7. A combination as in claim 6 further comprising logic network means connected to at least two outputs of said dematrixing means, each amplifier of said second amplifier array including an additional gain control input port, said logic network means including means for providing a first gain adjusting potential connected to the gain controlling additional terminal of two amplifiers of said second amplifier array, and a second gain control output signal to the gain controlling additional port of an additional and separate two amplifiers of said second amplifier array.

8. A combination as in claim 7 further comprising a source of constant potential, and switching means for connecting said additional gain control ports of said second amplifier array to said logic network means or to said source of constant potential.

9. A combination as in claim 1 further comprising first and second amplifiers each connected to a different one of said linear junction means.

10. A combination as in claim 9 further comprising third and fourth amplifiers connected to an additional two of said summing means, and four loudspeakers connected to said first through fourth amplifiers.

11. A combination as in claim 10 wherein said four discrete quadraphonic audio program signal supplying means comprises a tape deck, a phonograph and an encoded signal demodulator.

* * * * *